March 29, 1938.  J. H. LOCKE ET AL  2,112,295
MINE CAR
Filed Aug. 16, 1935  2 Sheets-Sheet 1

Inventors
John H. Locke
William M. Sheehan
By Rodney Bedell
Attorney

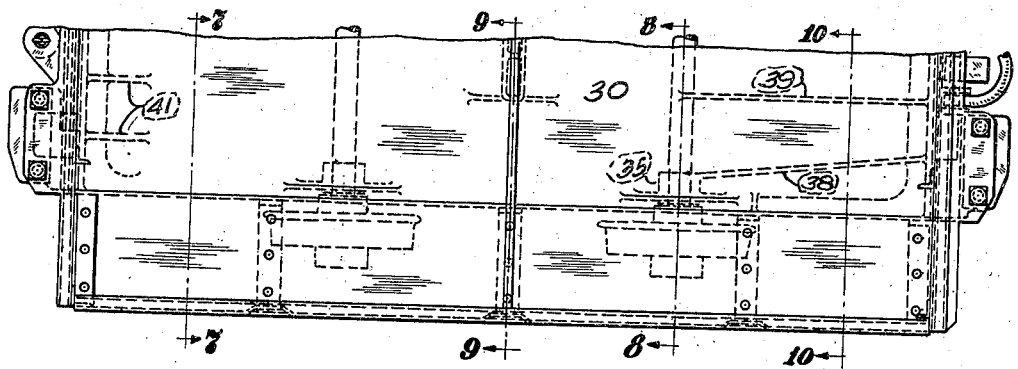
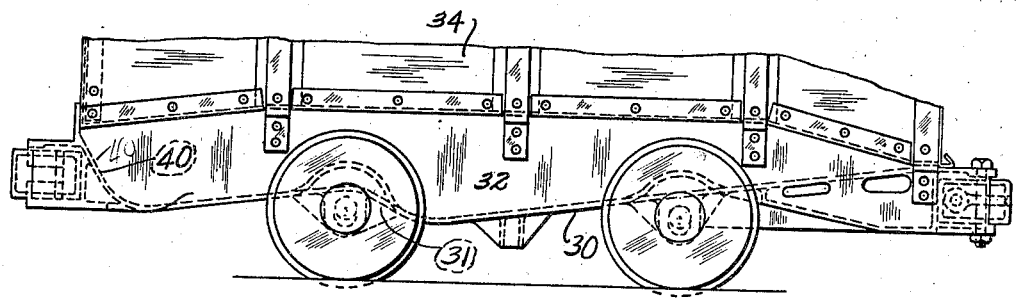
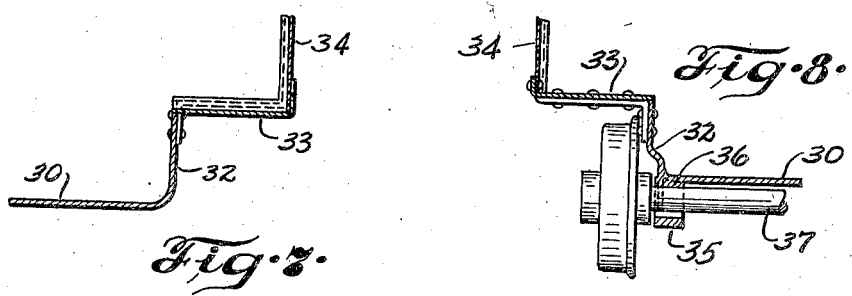
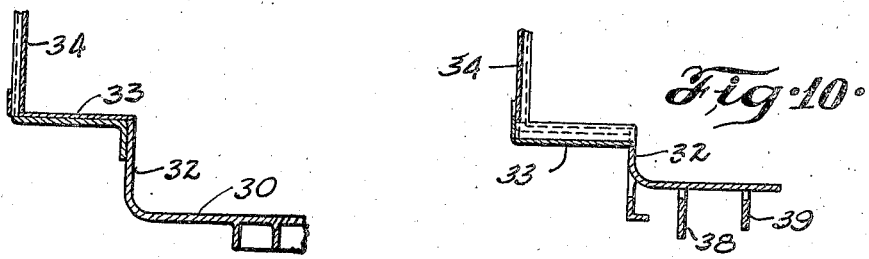

Patented Mar. 29, 1938

2,112,295

UNITED STATES PATENT OFFICE 2,112,295

MINE CAR

John H. Locke, Villanova, and William M. Sheehan, Merion, Pa., assignors to General Steel Castings Corporation, Granite City, Ill., a corporation of Delaware Application August 16, 1935, Serial No. 36,452

5 Claims. (Cl. 105—364)

The invention relates to railway rolling stock and more particularly to relatively small cars such as are used in mines for hauling coal, ore, and similar products.

The invention consists in underframing and wheel mounting structure for such vehicles.

The main object of the invention is to provide increased strength and rigidity of floor and buffer construction for a vehicle of the type described while retaining simplicity of structure and light total weight for the complete vehicle.

Another object is to simplify with utmost safety the wheel and axle mounting on a vehicle underframe or floor structure and, more particularly, to effect a simple form of spring mounting for the frame of a vehicle of this type.

These and other detail objects are attained by the structure in the accompanying drawings, in which—

Figure 1:
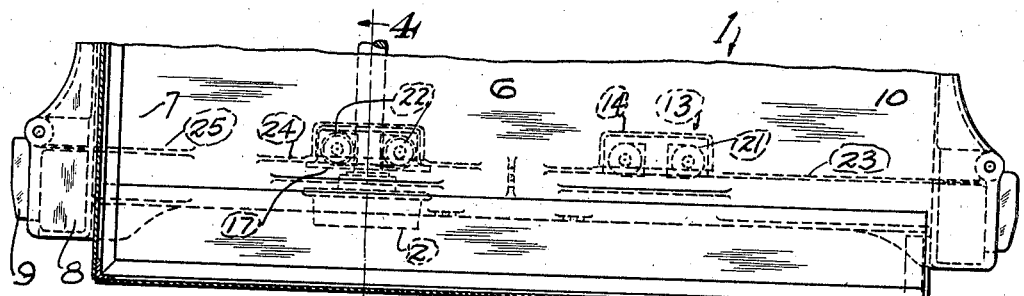
Figure 1 is a top view of one-half of a mine car which can be tilted bodily to dump its load through one end.
Figure 2:
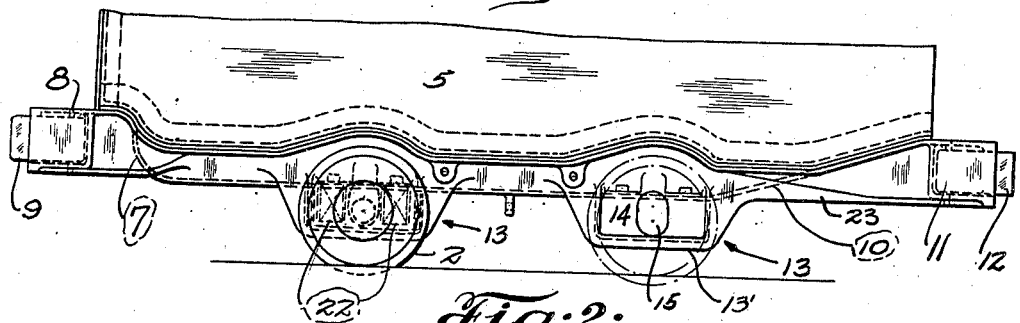
Figure 2 is a side elevation of the same structure.
Figures 3, 4, 4A:
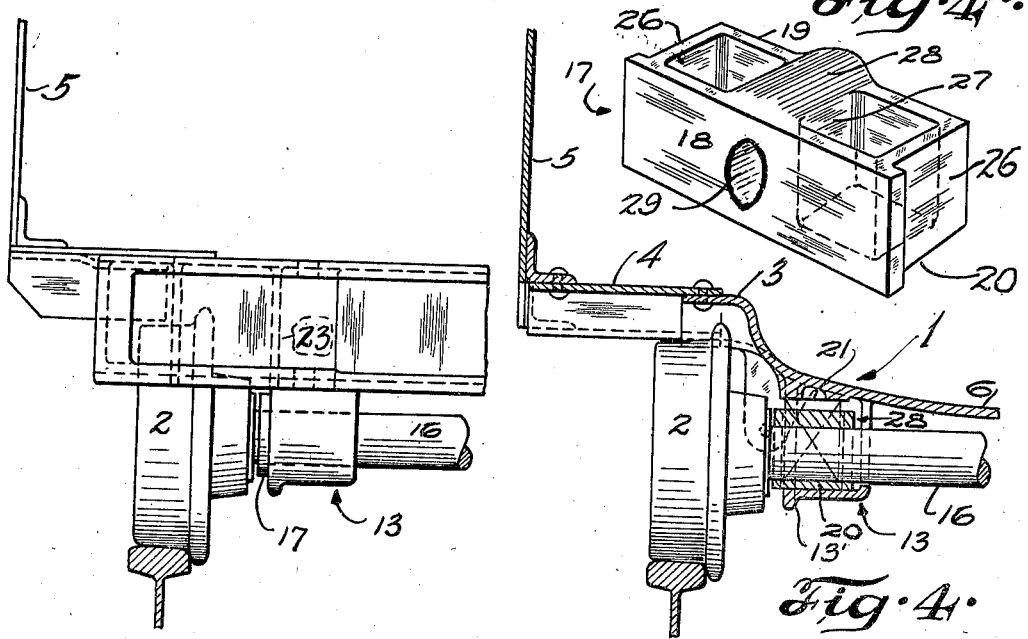
Figure 3 is a view of the right hand end of the structure shown in Figure 1.
Figure 4 is a vertical transverse section taken on the line 4—4 of Figure 1.
Figure 4a is an isometric view of a detail of the axle mounting structure.

Figure 5 corresponds to Figure 1 but illustrates a modified form of the invention.

Figure 6 is a side elevation of the structure shown in Figure 5.

Figures 7, 8, 9, and 10 are vertical transverse sections taken on the corresponding section lines of Figure 5.

The main structural member of the vehicle illustrated in Figures 1 to 4a is a casting 1 having a seamless floor forming web extending from end to end of the vehicle and terminating laterally of the vehicle, adjacent to the wheels 2, in a flange 3 arranged to mount a floor extension plate 4 which carries the car side wall 5 along its outer edge.

The main central portion 6 of member 1 extends at the same level throughout the major portion of the length of the vehicle but is turned upwardly at 7 near the left-hand end to form the lower portion of the vehicle end wall, and this end of the web includes a pocket-like structure 8 for mounting buffing elements 9 and to which draft devices (not shown) may be attached. The right-hand end of the central portion 6 is inclined upwardly at 10 to facilitate dumping the load through the open end of the car, and beneath the inclined portion 10 is a pocket structure 11 for buffing elements 12 and for the attachment of draft elements.

Intermediate the ends of the car, casting 1 includes depending housings 13 opening outwardly and each having top, bottom, and end walls and an inner wall 14 with a vertically elongated opening 15 for receiving an axle 16. A rib 13' extends from the floor web at one side of the housing under the latter to the floor web at the other side of the housing.

A combined axle box and spring yoke 17 is inserted laterally in each housing 13 and includes an outer wall 18, an inner wall 19, a bottom wall 20, end walls 26 and intermediate walls 27 joined by a short top wall 28. Outer wall 18 is slightly longer than the outer opening in housing 13 and engages the outer edges of the housing end walls to limit the inward movement of the axle box. Box walls 27 and 28 and an intermediate portion of bottom wall 20 form a mounting for the axle which extends through an opening 29 in the box outer wall 18.

The pockets at each side of the axle mounting receive coiled springs 22 which support the car through pads 21 on the floor web. The box end walls 26 transmit longitudinal forces to and from the ends of housing 13, and walls 18 and 19 brace walls 26 against such forces.

Reinforcing webs 23 extend lengthwise of the car from housings 13 to bumper pockets 11, and similar but shorter webs 24 and 25 brace the axle housings and the pocket 8.

Figures 5 to 10 illustrate a modified structure in which the floor web casting 30 is inclined throughout its length and descends to a level below the tops of the axles, and the floor web is recessed intermediate its ends at 31 to accommodate the rear axle. The upright flanges 32 at the sides of main web 30 extend above the tops of the wheels and provide a plain face for mounting the relatively light floor side extensions 33 and side walls 34. Flanges 32 are of substantial depth from end to end of the car and cooperate with the main bottom web 30 to form a load carrying and longitudinal force-transmitting member from one end of the car to the other.

Axle housings 35 depend from web 30 and include bearings 36 which ride directly upon the axles 37. In this form of the invention, no axle boxes or springs are utilized as in the form previously described. The discharge end of the main web is reinforced by vertical ribs 38 and 39, the first of which extends from the axle housing 35 to the buffer pocket structure. The second web extends from the end of the car to a point on the bottom web just over the adjacent axle. The opposite end of the main bottom web includes an upturned wall 40 which is reinforced by suitable ribs 41.

In each form of the invention, the central cast structure extends about two-thirds of the width of the vehicle and may be made as heavy as necessary to carry the load and transmit the draft and buffing forces, while the remainder of the car floor and the side walls may be made relatively light as they will be relieved of the functions assumed by the central member.

This construction, while providing substantial mountings for bumpers and axles, at the same time reduces the width of the casing to an amount sufficient to incorporate these elements, thus making unnecessary a casting of greater width. In this way, the cost of manufacture is reduced to a minimum while at the same time providing the necessary essentials to utility.

The journal receiving housing is closed on the bottom, thus eliminating the necessity of bottom ties. This makes a very compact and substantial arrangement of axle mounting where springs are used. The springs will first be inserted in the box or yoke and they may then be moved transversely into position in the housing or pedestal. When so assembled, the axle will be inserted through the housing and box and between the coiled springs, and suitable dust collars may be applied to the axles. If roller bearing wheels are used, the roller bearings will be mounted on the axles and the wheels secured thereon by means of nuts on the ends of the axle. This method of assembly greatly simplifies the axle mounting and positively prevents disassembly of the spring mounted axles. In either form of axle mounting, the permanent attachment of housing to floor or underframe insures against separation of wheel and axle assembly from car body.

The invention may be embodied in other forms than those illustrated and the exclusive use of all modifications coming within the scope of the claims is contemplated.

What is claimed is:

1. In a vehicle of the class described, wheels and axles, a body including a one-piece relatively heavy bottom member forming a seamless floor portion from end to end of the vehicle and having a width substantially less than the width of the body floor and being recessed upwardly to receive the upper portions of said wheels, and a relatively light structure supported solely by the edge portions of said member and extending outwardly horizontally and upwardly from the latter to form a lateral extension of the floor and body side walls.

2. In a vehicle of the class described, wheels and axles, a body including a one-piece relatively heavy bottom member forming a seamless floor portion from end to end of the vehicle and having a width substantially less than the width of the body floor and including buffer receiving structure at its ends and adapted in itself to transmit buffing and draft forces throughout the length of the car and having wheel receiving recesses intermediate its ends, and a relatively light structure attached to said member and extending horizontally therefrom, to complete the vehicle floor, and upwardly to form the vehicle sides.

3. In a vehicle of the class described, wheels and axles, a one-piece relatively heavy bottom member forming a seamless floor portion from end to end of the vehicle and including integral axle mountings and terminating laterally of the vehicle adjacent to said mountings, and a relatively light structure mounted on the sides of said member and forming a floor portion extending over and beyond said axle mountings and also forming body side walls.

4. In a vehicles of the class described, wheels and axles, a body including a one-piece relatively heavy bottom member forming a seamless floor portion from end to end of the vehicle, said member being of irregular contour to accommodate said wheels and axles and to facilitate discharge of the vehicle load and having a width substantially less than the width of the body floor and terminating in an even face upright flange, and relatively light floor horizontal extension and side wall structure secured to said flange.

5. In a vehicle of the class described, wheels and axles, a central floor portion comprising a relatively heavy one-piece casting extending from end to end of the car and between the wheels on opposite sides of the car and including integral axle mountings and terminating laterally of the vehicle adjacent to said wheels and mountings and having parts inclined from a point below the level of said axles upwardly over said axles towards a dumping end of the car, and a relatively light side structure mounted on the sides of said casting and extending over said wheels with end parts inclined downwardly towards said car end.

JOHN H. LOCKE.
WILLIAM M. SHEEHAN.